| United States Patent [19] | [11] Patent Number: 4,537,421 |
|---|---|
| Teachout | [45] Date of Patent: Aug. 27, 1985 |

[54] FOLDABLE DOLLY

[76] Inventor: Paul H. Teachout, 23 Acacia Dr., Orinda, Calif. 94563

[21] Appl. No.: 567,742

[22] Filed: Jan. 3, 1984

[51] Int. Cl.³ ............................................. B62B 1/04
[52] U.S. Cl. .................................. 280/654; 211/195; 248/129; 248/150; 280/47.24
[58] Field of Search ...................... 280/47.24, 654, 652, 280/47.28, 47.27, 47.29; 211/96, 168, 195, 81, 85; 248/129, 165, 150; 16/312, 317

[56] References Cited

U.S. PATENT DOCUMENTS 3,168,329  2/1965  Goldschmidt ................... 211/195 X
4,448,434  5/1984  Anderson ...................... 280/47.28 X Primary Examiner—Joseph F. Peters, Jr.
Assistant Examiner—Mark C. Dukes
Attorney, Agent, or Firm—Manfred M. Warren; Robert B. Chickering; Glen R. Grunewald

[57] ABSTRACT

A foldable dolly in which the arms are rotatably mounted to the frame preferably by means of interengaging sleeves formed with opposed ramps and opposed shoulders and positioned in relatively vertical alignment such that the ramps and shoulders of the first sleeve mate with the ramps and shoulders of the second sleeve. The sleeves are thereby found to permit rotation of the arms between a folded, collapsed position and an extended deployed position, while at the same time providing enhanced rigidity and stability of the arms at the extended, deployed position.

5 Claims, 5 Drawing Figures

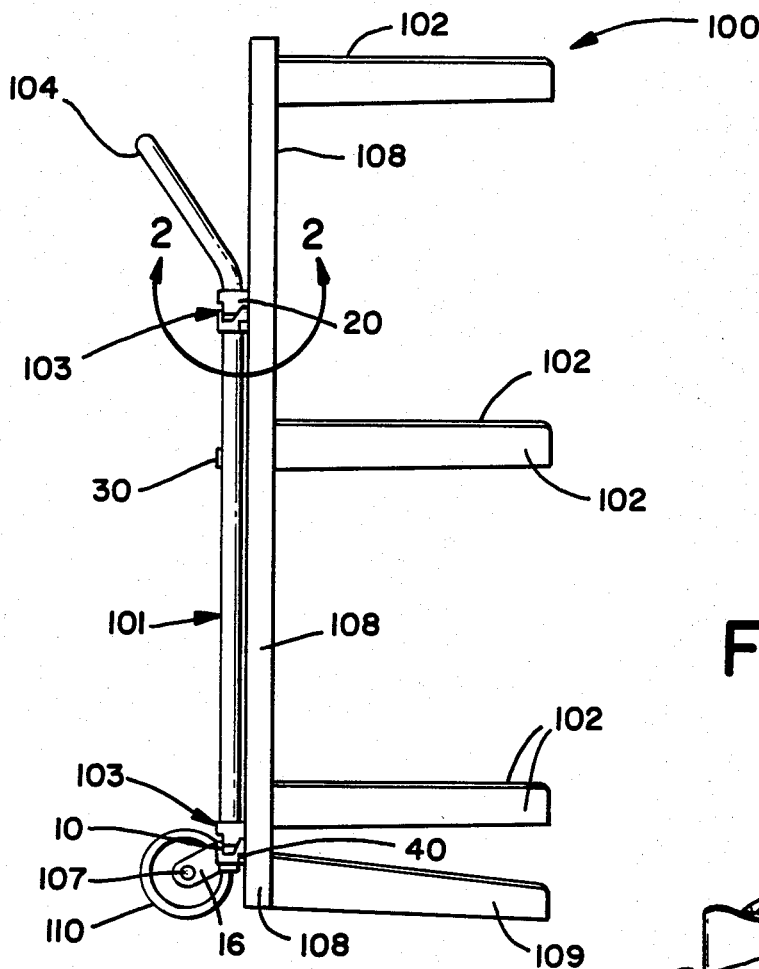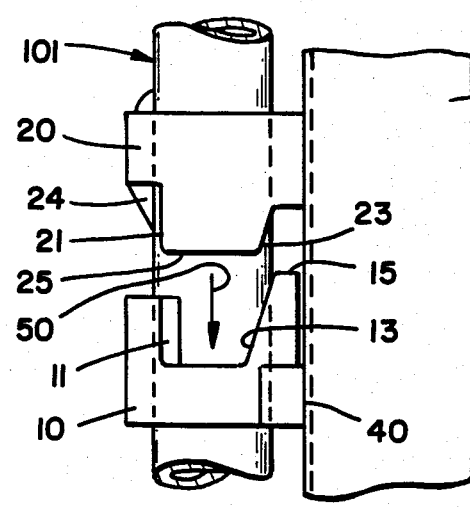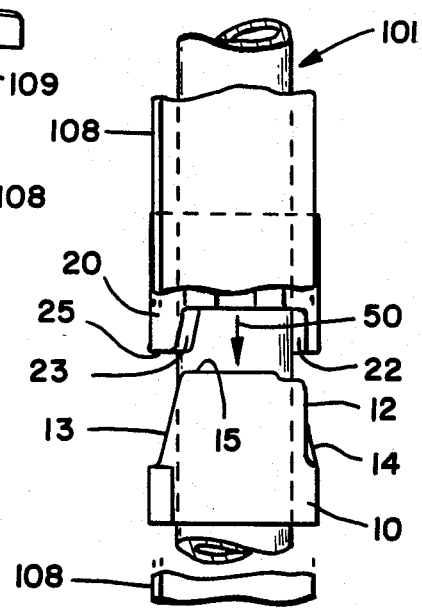

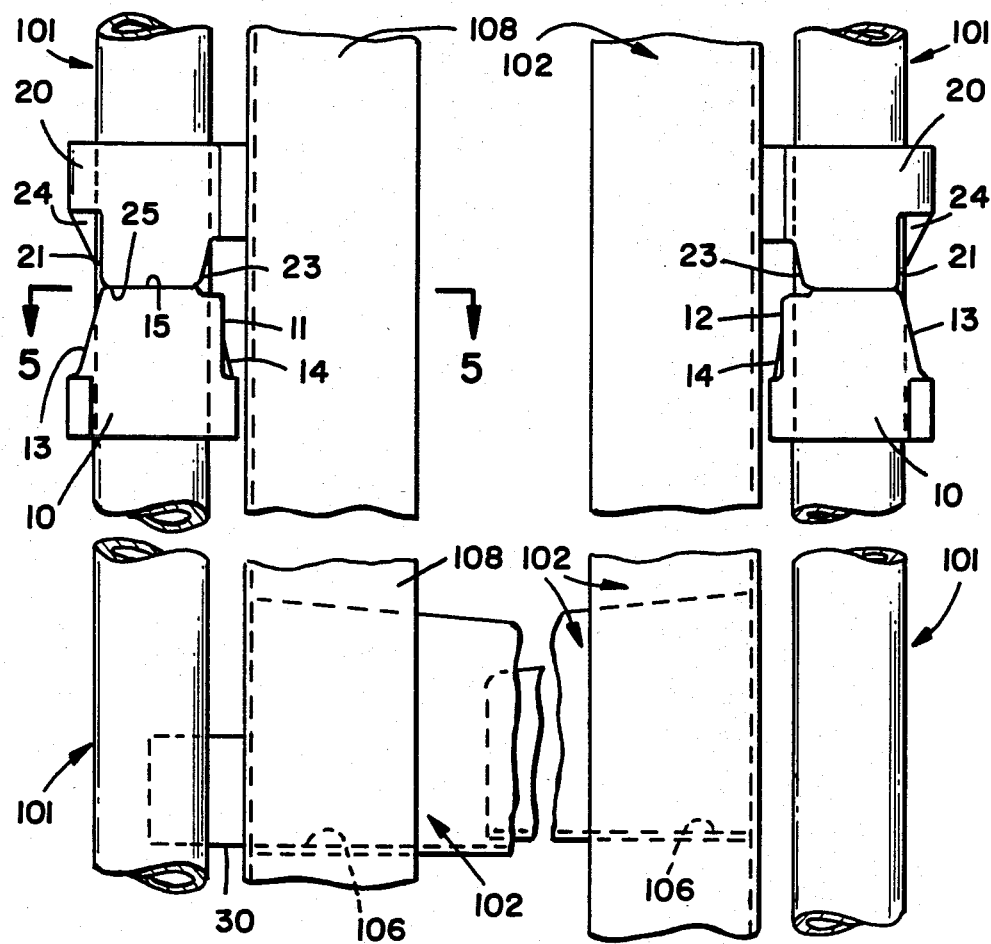
FIG_4
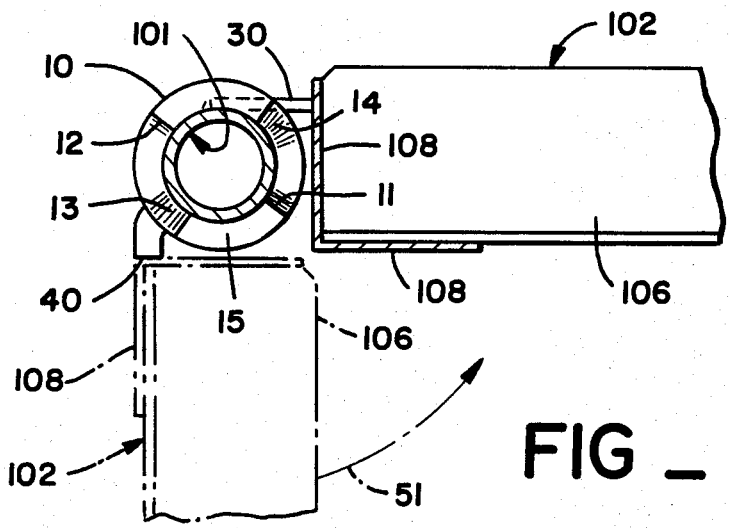
FIG_5

FOLDABLE DOLLY

TECHNICAL FIELD

This application relates, in general, to dollies or hand trucks, and more particularly, to dollies which have foldable or articulated arms.

BACKGROUND OF THE INVENTION

In the past, foldable dollies have been known in which a conventional dolly is equipped with movable arms that rotate between a collapsed, folded position and an extended, deployed position for the carrying of trays containing various products, such as bread, rolls and the like. Conventional foldable dollies are constructed with notched sleeves rotatably and slidably mounted on vertical frame members. The sleeves provide mounting means for the arms, and the notches mate with protrusions on the frame members to provide a stop for the arms in the deployed position. To deploy the arms, the sleeves are rotated until the notches are over the protrusions, at which point the sleeves are allowed to slide down on the frame members to engage the protrusions in the notches. Consequently, this configuration must provide clearances between both the notches and mating protrusions and the sleeves and frame members. These inherent clearances permit vibration of the arms when the dolly is wheeled over a threshold or over an irregular or rough surface, and the vibrations are of accordingly greater amplitude at the ends of the dolly's arms. The greater displacement at the arm ends, in conjunction with the clearances inherent in the conventional designs, can cause the arms to splay and the trays to fall, risking damage to the goods and to the dolly.

Accordingly, it would be highly advantageous to provide a foldable dolly having movable arms, that, when extended in the deployed position, will not splay due to vibrational forces and to the inherent clearances needed to permit the arms to be folded.

Another characteristic of the conventional foldable dolly constructed in the manner previously discussed is that the sleeves on which the arms of the dolly are mounted will often bind against the dolly frame when the operator attempts to vertically slide and rotate the sleeves from the deployed position to the folded position. Consequently, it would be advantageous to provide a foldable dolly having arms that will move easily, without binding, between the collapsed, folded position and the extended deployed position.

The present invention solves the aforementioned problems simply and economicaly, providing a dolly that minimizes the risk of damage to the goods being carried and to the dolly itself, as well as having arms that fold smoothly into the collapsed position, as set forth below.

OBJECTS AND SUMMARY OF THE INVENTION

A. Objects of the Invention

In accordance with the foregoing background discussion, an object of this invention is to provide an improved dolly having arms that, when deployed, will not splay due to vibration or shock loading and yet which have the inherent clearances needed to permit the arms to be folded.

It is a further object of this invention to provide such a dolly that, because of its stability, will be less likely to cause damage to goods being carried on it and will be less likely to suffer damage while in use.

An additional object of this invention is to provide an improved, foldable dolly that is easy and inexpensive to construct, durable and easy to operate.

Another object of this invention is to provide a foldable dolly having arms which, while rigid in the deployed, are moved easily and without binding, to the collapsed position.

Other objects, advantages and features of the invention will be apparent from the following detailed description of the preferred embodiment, when read in conjunction with the accompanying drawings.

B. Summary of the Invention

With the foregoing and other objects in view, a foldable dolly in accordance with the present invention includes a frame and two arms rotatably mounted by mounting means to the frame. The mounting means includes interengaging shoulders that provide a stop, limiting rotation of the arms at the deployed position. The improvement in the dolly of the present invention comprises, briefly, the mounting means including a ramp formed and positioned to urge the shoulders into interenagement in the deployed position and formed to permit rotational movement of the arms from the deployed position to the collapsed position. The ramp removes the clearances in the arm mounting means so that the device has greatly improved stability in the deployed position. Preferably, the means by which the arms are mounted to the frame are gravity-biased, so that the arms are virtually immovable in the deployed position. In one embodiment, the mounting means comprises pairs of sleeves mounted on the frame and on the arm. The sleeves are provided with mating ramps and opposed shoulders that interengage to fix the arms in the deployed condition and yet automatically lift the sleeves and arms when rotated toward the collapsed position.

BRIEF DESCRIPTION OF THE DRAWINGS

FIG. 1 is a side-elevational view of the foldable dolly in accordance with one specific embodiment of the invention.

FIG. 2 is an enlarged, fragmentary side-elevational view of the area bounded by line 2—2 and the interengaging sleeves of the preferred embodiment, with the arms in the extended, deployed position.

FIG. 3 is a front-elevational view of the sleeves corresponding to FIG. 2.

FIG. 4 is a fragmentary, front-elevational view of the embodiment of FIG. 1 compacted to show both arms in the collapsed, folded position.

FIG. 5 is a cross-sectional view taken substantially along the plane of line 5—5 in FIG. 4.

DETAILED DESCRIPTION OF THE PREFERRED EMBODIMENT

Referring now in detail to the drawings, there is illustrated a foldable dolly 100 in accordance with one specific embodiment of the invention, which includes frame means 101, and arm means 102 rotatably mounted to the frame means by interengaging sleeves which comprise mounting means 103. Frame 101 is preferably formed from an inverted U-shaped tubular member and includes rearwardly inclined handle section 104. Dolly arms 102 are mounted by mounting means 103 to both of the downwardly depending legs of the inverted U-shaped frame to provide pairs of arms on which trays can be supported.

The interengaging sleeves of mounting means 103 preferably include a first sleeve 10 rigidly mounted (for example by welding) to frame means 101. Sleeve 10 includes a pair of spaced apart ramps 13 and 14 and a pair of spaced apart, vertically extending, opposed shoulders 11 and 12 (as best may be seen in FIG. 5). A second sleeve 20 is mounted to vertical element 108 of arm means 102 and includes a pair of spaced apart ramps 23 and 24 (FIGS. 2 and 4) and a pair of spaced apart, vertically extending, opposed shoulders 21 and 22 (FIGS. 2 and 3). The ramps and shoulders of the second sleeve are reversed from and formed and positiond to mate respectively with the ramps and shoulders of the first sleeve. The first and second sleeves are positioned in relatively vertical alignment enabling the arm means to be folded together in an overlapping, collapsed position (FIGS. 4 and 5) and to be rotated to an extended, deployed position (FIGS. 1, 2, 3 and phantom lines in FIG. 5).

The provision of mating ramp means opposite stops or shoulders on the sleeves results in a structure in which movable sleeve 20, carrying arms 102, wedges down in the notches provided between shoulder 11 and ramps 14 and shoulder 12 and ramp 13 of sleeve 10. This wedging action causes the vertically extending shoulders 21 and 22 on sleeve 20 to bear against shoulders 11 and 12 so that there is no play or clearance between the shoulders 21 and 11, on the one hand, and 22 and 12 on the other hand. Moreover, gravity and any load on arms 102 tend to bias the sleeve 20 downwardly so that the mating wedges or ramps maintain the shoulders in face-to-face, abutting engagement.

Thus, unlike the notch and protrusion approach of prior art foldable dollies which requires clearance between the notch and protruding element, the opposed ramps on sleeves 10 and 20 eliminate the clearance between the opposed shoulders and accordingly rigidly index and secure arms 102 in the deployed position.

Notwithstanding the improved rigidity achieved by employing arm mounting means formed with interfitting ramps, the arm mounting structure of the present invention also is formed for improved and relatively easy movement of the arms from the deployed position to the folded or collapsed position. As will be seen, ramp 23 mates with ramp 13 and ramp 24 mates with ramp 14 so that rotation of arm 102 and sleeve 20 from the deployed toward the collapsed position (the direction of arrow 51 in FIG. 5) cause sliding engagement of the ramps, which automatically lifts sleeve 20 (and arm 102) upwardly until horizontal surface 25 on sleeve 20 rests on horizontal surface 15 on sleeve 10 (FIG. 4).

Ramps 13–14 and 23–24, therefore, produce a wedging action when rotated in a direction deploying the arms and produce a camming action when rotated in a direction folding the arms. The camming action of the ramps further automatically lifts sleeves 20 upwardly without binding of the sleeves against frame members 101, as had been common in prior art dollies.

As may be seen in FIG. 1, arms 102 on opposite legs of frame 101 are preferably sightly vertically displaced with respect to each other (double lines along the tops of the arms). This displacement is determined by the height at which sleeves 10 are secured to frame 101 and enables folding of the arms together with the horizontal tray supporting flanges 106 on the arms in relatively nested relation (FIG. 4).

Nesting of arms 102 and flanges 106 can also be achieved by forming the sleeves with horizontal surfaces 15 and 25 on one side of the dolly which will result in greater vertical displacement of the arms on one side of the dolly during camming to the folded position. Arms 102 fold to a position inside tubular frame members 101, which is accommodated by the inclined handle portion 104 at the top of the frame and axle 107 which connects the bottom of the frame, but which is rearwardly displaced. It is preferable that the lower set of sleeves 10 also include arms 16 to which axle 107 and wheels 110 are mounted.

It should be noted that arm means 102 also preferably includes a pair of laterally extending, ground enaging rests or foot elements 109 which fold with the arm assembly and nest together in the folded position. Rests 109 allow the dolly to be free-standing in a stable position, particularly when loaded with trays.

In order to limit the pivoting of arm means 102 so that they do not go beyond the collapsed position, the foldable dolly of the present invention preferably also includes limit means 30 secured to at least one of the legs frame 102 and formed to engage vertical element 108 (FIGS. 4 and 5).

In order to provide additional stability, first sleeve 10 optionally may be provided with auxiliary stop means 40 which is formed and positioned to limit rotation of the arm means 102 at the extended, deployed position, as illustrated in FIGS. 2 and 5. The auxiliary stop means assists shoulders 11, 12, 21 and 22 in removing the play from the sleeves and also tends to limit the play between frame 101 and sleeve 20 to provide additional rigidity in the deployed position.

In connection with sleeve 10, it will be apparent that the ramps 13 and 14 and stops 11 and 12 could be provided by indepedent elements secured to frame 101. The use of sleeves 10, however, simplifies the fabrication process by enabling the sleeve to be slid to the desired position on tubular frame 101 and welded in place.

With the arrangement as described in detail above, it should be apparent that there has been provided a simple and stable foldable dolly having arms, when placed in the extended, deployed condition that will not splay when the dolly is wheeled over thresholds or irregular surfaces. Thus, the risk of damage to goods being carried on the dolly is thereby minimized, as well as the risk of damage to the dolly.

Although one embodiment of the invention has been described in detail above, it is to be understood that various modifications may be made from the specific details described, without departing from the spirit and scope of the invention.

What is claimed is:

1. A foldable dolly including frame means, arm means, and mounting means movably mounting said arm means to said frame means for rotation of said arm means with respect to said frame means between an outwardly extending deployed position and a collapsed stored position, said mounting means including interengaging shoulders providing stop means formed to limit rotation of said arm means at said deployed position, and said mounting means further including a first ramp carried by said frame means and a second ramp formed for mating sliding engagement with said first ramp and carried by said arm, said first ramp and said second ramp being formed and positioned to urge said shoulders into interengagement in said deployed position and formed to permit rotational movement of said arm means from said deployed position to said collapsed position, wherein the improvement comprises:

said stop means is provided by a first substantially vertically oriented shoulder carried by said frame means in opposed relation to said first ramp, and a second substantially vertically oriented shoulder carried by said arm means in opposed relation to said second ramp.

2. The foldable dolly as defined in claim 1 wherein, said first ramp and said first shoulder are formed in a first sleeve mounted to said frame means, and said second ramp and said second shoulder are formed in a second sleeve mounted to said arm means.

3. The foldable dolly as defined in claim 2 wherein, said first sleeve is formed with a pair of spaced apart first ramps and a pair of spaced apart opposed first shoulders, said second sleeve is formed with a pair of spaced apart second ramps and a pair of spaced apart opposed second shoulders positioned to mate respectively with said ramps and shoulders on said first sleeve.

4. The foldable dolly as defined in claim 3 wherein, said first sleeve is formed with auxiliary stop means mounted and positioned to limit rotation of said arm means at said deployed position.

5. A foldable dolly including:

frame means and arm means movably mounted to said frame means by a first sleeve mounted to said frame means and a second sleeve mounted to said arm means, said first sleeve being formed with a pair of spaced apart first ramps and oppositely positioned pair of spaced apart first shoulders, said second sleeve being formed with a pair of spaced apart second ramps and oppositely positioned pair of spaced apart second shoulders, and said second sleeve being positioned in relatively vertical alignment to mate with said ramps and said shoulders in said first sleeve the arm means folded together in an overlapping collapsed position, said first shoulder and said second shoulder being formed for interengagement upon rotation of said arm means to said deployed position auxiliary stop means mounted and positioned on said first sleeve to additionally limit rotation of said arm means at said deployed position.

* * * * *